United States Patent [19]

Graham

[11] 4,284,538
[45] Aug. 18, 1981

[54] SIZING COMPOSITION FOR GLASS FIBERS

[75] Inventor: Roy R. Graham, Lexington, N.C.

[73] Assignee: PPG Industries, Inc., Pittsburgh, Pa.

[21] Appl. No.: 50,561

[22] Filed: Jun. 21, 1979

[51] Int. Cl.³ .................. C03C 25/02; C08L 3/02
[52] U.S. Cl. ........................ 260/17.4 ST; 65/3 C;
260/29.6 NR; 260/29.6 TA; 162/156; 162/168
N; 162/169; 162/175; 428/438; 428/441
[58] Field of Search ............ 260/17.4 ST, 29.6 TA,
260/29.6 NR

[56] References Cited

U.S. PATENT DOCUMENTS

| | | | |
|---|---|---|---|
| 2,820,043 | 1/1958 | Rainey et al. ........................ 548/341 |
| 2,906,660 | 9/1959 | Hungerford et al. ................. 162/102 |
| 2,917,411 | 12/1959 | Kress .................................. 428/274 |
| 2,969,355 | 1/1961 | Simons ................................. 536/33 |
| 3,138,610 | 6/1964 | Buc et al. ............................. 548/348 |
| 3,174,874 | 3/1965 | Fikentscher et al. .................. 427/27 |
| 3,296,174 | 1/1967 | Pickard ........................ 260/29.6 XA |
| 3,429,760 | 2/1969 | Roskos et al. ........................ 156/167 |
| 3,475,149 | 10/1969 | Eckerle et al. ......................... 65/3 R |
| 3,586,639 | 6/1971 | House ................................... 252/313 |
| 3,814,715 | 6/1974 | Nalley et al. ................. 260/29.6 XA |
| 3,829,302 | 8/1974 | Haynes et al. .......................... 65/3 C |
| 4,039,716 | 8/1977 | Johnson ............................... 428/378 |
| 4,052,256 | 10/1977 | Renaud et al. ........................ 162/145 |
| 4,077,930 | 3/1978 | Lim et al. ...................... 260/29.6 TA |
| 4,143,006 | 3/1979 | Workman ..................... 260/17.4 ST |
| 4,197,349 | 4/1980 | Walser ................................... 65/3 C |

*Primary Examiner*—Edward M. Woodberry
*Attorney, Agent, or Firm*—Kenneth J. Stachel

[57] ABSTRACT

A sizing composition is provided for glass fibers to render the glass fibers more dispersible in aqueous solutions. The sizing composition has present an aqueous dispersion of cationic imidazoline; aliphatic, aromatic and/or polymeric ester; and polyethylene in an amount equivalent to an amount in the range of about 0.1 to about 1.5 weight percent of the aqueous sizing composition based on an approximately 30 percent active aqueous dispersion. The sizing composition may also contain, depending on the use, other components such as starch, lubricant, emulsifying agents, wetting agents, plasticizers, biocides and the like.

18 Claims, No Drawings

SIZING COMPOSITION FOR GLASS FIBERS

The present invention is directed to a sizing composition for glass fibers that produces sized glass fibers having improved dispersibility in aqueous solutions.

Glass fibers have been used in combination with other types of fibers or alone in the production of paper-like sheet materials. Glass fibers have been used as a supplemental fiber in specialty synthetic fiberwood pulp composite papers. While it has also been recognized that small diameter glass fibers can be used to produce paper-like sheet material that has a high strength and can be used as air or liquid filtration papers. With the growing concern of possible health hazards associated with asbestos fibers, the use of glass fibers as a replacement for asbestos fibers in producing sheet-like material is being investigated.

The glass fibers differ from natural cellulose fibers or asbestos fibers in that the glass fibers are more difficult to disperse in water and they do not fibrillate in the usual paper-making sense. The dispersion problem occurs when a slush, an aqueous suspension of dispersed fibers, of the glass fibers or the combination of glass fibers and cellulose fibers is prepared as a preliminary step to the formation of a wet web. The dispersion problem of glass fibers is caused by several factors including the length of the fibers, the electrical charges on the fibers, the diameter of the fibers, the differing water absorbtion characteristics, and the presence of textile sizes or finishes on the glass fibers. When the glass fibers have a small diameter, i.e., a micro fiber with a diameter up to around 6.4 microns, the glass fibers produced without a sizing composition or with a sizing composition that can be easily removed or with a sizing composition containing a water-dispersible starch binder have found some utility. When the diameter of the glass fibers increases above the micro size the problem of poor dispersibility becomes increasingly significant.

The art in trying to improve the dispersibility of glass fibers has employed the use of additional chemicals that may be anionic, cationic or nonionic depending upon the nature of the fiber and may be supplied as a finish on the fiber or added separately to the aqueous system. For example, the art discovered that an acid pH obtained by the addition of strong mineral acids or sodium hexametaphosphate was useful in dispersing glass fibers (U.S. Pat. Nos. 3,749,638 and 2,919,221). Also the art has shown that polyacids, like phosphoric, and carboxy methyl cellulose, can be used as dispersing aids (U.S. Pat. No. 2,802,734). In addition, the art has shown that linear polysiloxanes containing at least 6 silicon atoms with each atom having 2 non-hydrolyzable oleophilic groups can be used to disperse glass fibers (U.S. Pat. No. 4,052,256). The use of these additional chemical agents either in a sizing composition for the glass fibers or as additional agents added to the aqueous system may be useful in dispersing micro size glass fibers and some may be useful in dispersing larger diameter glass fibers. There is still a need in the art for a sizing composition for glass fibers that renders the protection needed for glass fibers against further processing while at the same time does not interfere with but actually assists in dispersing glass fibers in an aqueous solution.

It is an object of the present invention to provide a sizing composition for glass fibers that yields sized glass fibers with improved water dispersibility.

It is a further object of the present invention to provide chopped sized glass fiber strands comprised of glass fibers having conventional diameters, wherein the glass fiber strand has improved water dispersibility to enable the use of the strands in the formation of a slush, which is a stable fiber dispersion, to form glass fiber paper.

SUMMARY OF THE INVENTION

The aforementioned objects of the invention are achieved by providing a glass fiber sizing composition comprising an effective amount of a mixture of cationic imidazoline; aliphatic, aromatic or polymeric ester; and polyethylene. The effective amount is any amount equivalent to an amount in the range of about 0.1 to about 1.5 weight percent of the aqueous sizing composition based on an aqueous emulsion of the mixture that is around 30 percent active.

In addition to the mixture of cationic imidazoline, ester and polyethylene, the sizing composition may contain one or more starch binders; lubricants, water soluble or water insoluble types; emulsifiers, humectants; wetting agents; anti-microbial agents; and the like.

DETAILED DESCRIPTION OF THE INVENTION

In a process for producing glass fibers formed by being drawn from molten cones of glass located at the tips of small orifices in a bushing where the glass fibers are chopped after being drawn while they are still in a wet condition, the sizing composition of the present invention need only contain the effective amount of the mixture of imidazoline, ester and polyethylene. The effective amount of about 0.1 to about 1.5 weight percent of the aqueous sizing composition is based on the use of a 31 percent active (contains around 69 percent water) aqueous emulsion of the cationic imidazoline; aliphatic, aromatic or polymeric ester; and polyethylene. The 31 percent active aqueous emulsion particularly suited for the sizing composition of the present invention is designated QUAKER 1680-601 commercially available from Quaker Chemical Corporation, Conshohocken, Pennsylvania. The sizing composition containing the effective amount of the aqueous dispersion would be applied to the glass fibers during their formation before they reach the drawing and winding apparatus or are chopped.

When the mixture of imidazoline, ester and polyethylene are used alone in the sizing composition, the mixture acts as the binder. This usage can occur when the sized glass fibers do not undergo a large number of additional processing steps such as when the fibers are chopped during the forming process or chopped after being placed on forming packages. The amount of the dried residue of the sizing composition having present only the aqueous dispersion after forming the sized glass fibers should be in the range of about 0.05 to about 0.30 LOI (loss on ignition).

In a process for producing glass fibers wherein glass fiber strands are composed of the glass fibers that are formed by being drawn at a high rate of speed from molten cones of glass located at the tips of small orifices in a bushing, a sizing composition of the present invention would contain the effective amount of the aqueous mixture of imidazoline, ester and polyethylene along with at least one starch binder if the strands are to undergo further processing. The glass fiber strands are produced by drawing the glass fibers over an application device for the application of the sizing composition and wound onto forming packages. A plurality of strands from the forming packages are mounted on a creel and the strands are unwound and combined in parallel form and chopped to produce chopped strand or wound onto a tubular support to produce a roving. The glass fiber roving can then be mechanically chopped to produce the chopped strand useful for addition to aqueous medium to form a slush of glass fibers for the production of glass fiber paper. In these processes, the glass fibers undergo a considerable amount of processing and handling and it is preferred that there are components in the sizing composition to protect the glass fibers from interfilament abrasion. For this reason the effective amount of the aqueous emulsion of imidazoline, ester, and polyethylene must be combined with a proper amount of starch binder and lubricant.

Any suitable starch binder can be employed in the sizing composition of the present invention. Suitable starch binders include high amylose-containing corn starch binders, low amylose-containing corn starch binders and high amylose-containing derivatized or cross-linked starch binders, or cationic starch binders with a normal amylose content. The starch sources include corn, wheat, potato, tapioca, waxy maize, sago, rice, hybrid starches, etc. A particularly suitable starch binder is designated "NABOND" commercially available from National Starch and Chemical Corporation. Other commercially available starches that may be used alone or in combination with one or the other or several starches and/or the Nabond starch include Mira Quick C starch, Hylon starch both well known in the art. The amount of starch present in the sizing composition is around generally the amount conventionally used in glass fiber textile sizing composition and preferably around 1 to about 5 weight percent based on total sizing composition.

The approximately 30 percent active aqueous emulsion of cationic imidazoline; aliphatic, aromatic or polymeric ester; and polyethylene is the Quaker 1680-601 available from Quaker Chemical Corporation. Non-exclusive examples of the cationic imidazoline include alkyl imidazoline like those prepared by the condensation of fatty acids with polyalkylene polyamines such as diethylene triamine, triethylene tetramine and tetraethylene pentamine. Polypropylene polyamines and higher polyalkylene polyamines may also be employed. Useful acids are stearic, lauric, oleic, ricinoleic, octanoic or commercial mixtures thereof. The amount of the aqueous emulsion used based on the 31 percent active Quaker 1680-601 is in the range of about 0.1 to about 1.5 weight percent based on the total sized composition. The aqueous emulsion can be prepared by any method known to those skilled in the art and the ratio of the three components in the emulsion can be in the range from any of the three components being present in a major amount while the remaining components are present in a minor amount to all three components being present in equal amounts. If the imidazoline component of the dispersion mixture is present in a minor amount, then the amount of the dispersion mixture in the sizing composition or on the glass would be increased in an amount proportional to the minority amount.

It is believed, but the present invention is not limited by this belief, that the aqueous dispersion mixture, alone or in combination with other components, like those described, functions as a dispersing aid for glass fibers because of the functions of the components of the aqueous dispersion. The imidazoline component appears to function as a dispersing agent and softening agent. The ester component appears to function as a lubricating agent and the polyethylene component appears to function as a spacing agent that spaces the glass molecules in the fibers.

The aliphatic, aromatic or polymeric ester can be any aqueous soluble or dispersible aliphatic, aromatic or polymeric ester. By polymeric ester it is meant to include any aqueous dispersible or soluble polymer having free ester groups. Non-exclusive examples of esters include monoesters, glycerides, diesters of glycols, aliphatic and aromatic dibasic and monobasic acids and triesters of phosphoric acid and monoesters of saturated and unsaturated fatty acids that are soluble or dispersible in aqueous solutions and aqueous dispersible esters of long chain acids and alcohols.

The lubricants which are found to be useful in the practice of the invention are typically vegetable oils which have been hydrogenated. A typical vegetable oil would be hydrogenated cotton seed oil, hydrogenated corn oil, hydrogenated soy bean oil, and the like. The preferred lubricant would be a hydrogenated soy bean oil in a preferred amount in the range of about 1 to 5 weight percent based on the total sizing composition.

The nonionic wetting agents useful in the sizing composition of the present invention are polyalkylene derivatives of esters, fatty acids, fatty alcohols, fatty amides, alkyl phenyl ethers, and other derivatives. A preferred nonionic wetting agent useful in the sizing composition of the present invention is polyethylene glycol 600 monolaurate which is shown to be effective in preferred amounts in the range of about 40 to 100 percent by weight based on the weight of the lubricant in the sizing composition.

A wide variety of conventional emulsifying agents can be used in the sizing composition of the present invention. Preferred are the non-ionic emulsifying agents such as the polyoxyethylene derivatives of fatty acid partial esters of sorbitol anhydrides or the polyoxyethylene derivatives of fatty alcohols or of alkyl-substituted phenols. Such emulsifiers are commercially available and include "TWEEN 81" from ICI Americas, Inc. which is a polyethylene derivative of sorbitan monooleate. Another example of the commercially available emulsifiers include "TRITON" emulsifiers from Rohm and Haas which are polyoxyethylene derivatives of alkyl-substituted phenols. Although non-ionic emulsifying agents are preferred, the cationic emulsifying agents can also be used in the sizing composition of the present invention. The amount of the emulsifying agent used in the sizing composition of the present invention is preferably an amount in the range of about 0.05 to about 2 weight percent of the sizing composition.

In addition to the aqueous emulsion of imidazoline, ester and polyethylene; lubricant; starch; wetting agent; and emulsifying agent, other ingredients may be added to the sizing composition to impart properties which are known to those skilled in the art. Cationic agents which can be included in the sizing composition such as acetyl or stearyl monoamine hydrochloride or acetate, decylamine, hexadecylamine and secondary and tertiary derivatives of the same, for example, dodecyl methylamine and salts thereof. Quaternary ammonium compounds such as trimethylstearyl ammonium bromides and chlorides and generally any of the amine compounds which disassociate in aqueous systems to provide a positive radial containing a group of more than 10, preferably 12 or more, carbon atoms can be employed. These materials are cationic active substances.

A biocide may be used in the sizing composition of the present invention, if desired, to prevent attack on the sizing solution by fungi or bacteria and to prevent mold attack on the amylose-containing starch derivatives. Suitable effective amounts of the biocide are about 3 milliliters to 75 gallons of the sizing composition. Examples of biocide which may be employed for this use are tributyl tin oxide, quaternary ammonium salts and mixtures thereof and the like.

Plasticizers can be employed in the sizing composition to lessen the brittleness of the strand and to improve end finding thereof. A plasticizer that is known to be a humectant and designed "CARBOWAX ® 300" is a polyethylene glycol with an average molecular weight of 300 and is available from Union Carbide Corporation. The amount of the plasticizer in the sizing composition can be used in an amount in the range of about 5 to about 50 percent by weight of the starch component.

The total solids (non-aqueous) content of the sizing composition of the present invention is about 0.1 to about 20 percent by weight of the sizing solution. Preferably the total solids is in the range of about 1 to about 10 percent by weight of the sizing solution. In all events the solids content of the sizing solution should be adjusted so that the viscosity at 40°–50° C. of said solution does not exceed 100 centipoises. This viscosity restriction is necessary in order that the filaments do not break during application of the sizing composition. For a further description of the sizing compositions of the present invention, reference should be made to the following examples.

EXAMPLE I

The preferred sizing composition for use in treating glass fibers in a process where the glass fibers are chopped while still in a wet environment during forming of the glass fibers has the formulation as depicted in Table I below.

TABLE 1

| Component | Amount - Grams per 10 gallons of water |
|---|---|
| Quaker 1680-601 (31% active aqueous emulsion of cationic imidazoline, ester, and polyethylene component) | 200 grams |
| Warm Water | 10 gal. |

The sizing composition was prepared by adding the Quaker 1680-601 aqueous emulsion to water with agitation. The aqueous sizing composition so prepared was applied to individual glass fibers during their formation where the glass fibers were drawn and chopped while still in a wet environment of forming. The aqueous sizing solution was applied to the individual fibers just after their emergence from orifices in an electrically heated platinum alloy bushing containing molten glass to form filaments with a diameter of $60\text{-}65 \times 10^{-5}$ inches. The aqueous sizing composition is applied to the filaments prior to the time they are chopped. Such an application is shown in more detail in U.S. Pat. No. 3,933,711. The sizing composition applied in the above-described manner had a solids content of 0.31, a pH of 5.8 and a viscosity of 5.5 at 148° F. (64° C.).

EXAMPLE II

A sizing composition for application to glass fibers in a similar manner as that in Example I was prepared having the formulation of Table 2 below.

TABLE 2

| Ingredients | Grams per 10 gallon of water |
|---|---|
| Quaker 1680-601 | 200 grams |
| Hot Water | 10 gal. |

The sizing composition had a solids content of 0.18, a pH of 5.3, a viscosity of 7.5 at room temperature and was applied to M fiber (a diameter of $60\text{-}65 \times 10^{-5}$ inches).

EXAMPLE III

A sizing composition applied to glass fibers in a similar manner as that of Example I had a formulation shown in Table 3.

TABLE 3

| Component | Amount - Grams per 10 gallons of water | Weight Percent of Total Sizing Composition |
|---|---|---|
| CATO 75 (cationic corn starch with a normal amylose content available from National Starch and Chemical | 500 | 1.3 |
| Quaker 1680-601 | 200 | .53 |

The sizing composition of Table 3 had a solids content of 1.4, a pH of 5.11, and a viscosity of 8.5 at room temperature 20°–24° C. and was used to size M glass fibers.

When the sized glass fibers are to be subjected to numerous process steps and when they are to be chopped after being placed on forming packages and dried, it is preferred that the sizing composition have present additional components to the aqueous dispersion. The aqueous dispersion of imidazoline, ester, and polyethylene is present in a preferred range of about 0.18 to about 1.1 weight percent and the starch component of the size is present in a preferred amount in the range of about 1 to about 5 weight percent based on total sizing composition. The starch may be one type of starch from those aforementioned or a combination of several starches. It is also preferred to have present a lubricant preferably soybean oil, one or more emulsifying agents like ethylene derivative of a sorbitol ester, a plasticizer like polyethylene glycol having a molecular weight of 300, one or more wetting agents like octyl phenoxy poly-(ethyleneoxy) ethanol, and a biocide like organo-thin bacteriocide, all present in their preferred or effective amounts.

In Examples IV through Example VIII the aqueous sizing solution was formed in the preferred manner by adding the starch components to water with steam cooking at 220° F. combining the starch with the remaining ingredients: lubricant and emulsifying agent previously combined to form an oil emulsion, plasticizer, wetting agent, biocide, and Quaker emulsion added in succession after each prior ingredient is dissolved, but generally any order of addition may be used as long as the lubricant and emulsifying agent is pre-emulsified before addition. The aqueous size so prepared according to the formulations in Table 4 were applied to individual glass fibers during their formation in the conventional manner from a glass fiber bushing. The aqueous sizing composition was applied to the individual fibers just after their emergence from orifices in an electrically heated, platinum alloy bushing containing molten glass to form filaments of 0.00025 inches in diameter. The aqueous size is applied to the filaments prior to the time they are grouped together to form a strand containing 150 filaments by means of a roller applicator which is partially submerged in the sizing composition containing reservoir. Such an application is shown in more detail in U.S. Pat. No. 2,728,972. The fibers are grouped into a strand by graphite guides and wound around a forming tube rotating at approximately 4,420 rpm to produce a strand travel of approximately 14,000 feet per minute.

Other methods and conditions of applying the sizing composition to the strand of glass fibers, such as a pad applicator, may be employed and the strand may be formed by means other than winding on forming tubes, such as by means of a pair of rotating wheel pullers which direct the strand into a suitable collecting device.

The sized glass fiber strand wound on the forming tube is then dried. This may be done by heating strand packages at a temperature and for a length of time sufficient to reduce the moisture level to that appropriate for further processing, typically around less than 1 percent by weight. After the strands have been dried to an acceptable level, the forming packages are mounted on a creel and subsequently unwound and processed through a chopper; any chopping device known to the art can be used. An example of a conventional chopper would be a Brenner chopper or a reciprocating knife which chops the strand into desirable length, i.e., about ½ inch.

Chopped strand which is produced according to the practice of the present invention has demonstrated excellent water dispersibility when used in a slush for producing glass fiber paper.

available in the product Quaker 1680-601 alone in combination with starch, lubricants, emulsifying agents, wetting agents, biocides, for use as sizing compositions for glass fibers.

I claim:

1. A sizing composition for glass fibers useful in rendering sized glass fibers with improved water dispersibility, comprising:
    about 0.1 to about 1.5 weight percent of the aqueous sizing composition of an aqueous emulsion mixture of cationic imidazoline; an aliphatic, aromatic or polymeric ester; and a polyethylene when the mixture is around 30 percent active.

2. The sizing composition of claim 1 wherein the sizing composition has an amount of starch in the range of about 1 to about 5 weight percent of the sizing composition.

3. The sizing composition of claim 2 having about 1 to about 5 weight percent of a lubricant selected from the group consisting of hydrogenated vegetable oils.

4. The sizing composition of claim 3 wherein the hydrogenated vegetable oil is a hydrogenated soy bean oil.

5. The sizing composition of claim 3 having an amount of emulsifying agent in the range of about 0.05 to 2 weight percent of the sizing composition.

6. The sizing composition of claim 5 wherein the emulsifying agent is a polyoxyethylene derivative of sorbitan monooleate.

7. The sizing composition of claim 5 having an amount of plasticizer in the range of about 5 to about 50 percent by weight of the starch component.

8. The sizing composition according to claim 7 wherein the plasticizer is a polyethylene glycol having a molecular weight of 300.

9. The sizing composition of claim 3 or 7 having an amount of wetting agent in the range of about 100 to 150

TABLE 4

| Component | Example 4 grams/10 gal | Example 4 Wt % | Example 5 grams/10 gal | Example 5 Wt % | Example 6 grams/10 gal | Example 6 Wt % | Example 7 grams/10 gal | Example 7 Wt % | Example 8 grams/10 gal | Example 8 Wt % |
|---|---|---|---|---|---|---|---|---|---|---|
| Mira Quik C (hybrid corn starch having an amylose content of 55% by weight) | 837 | 2.2 | 837 | 2.2 | 837 | 2.2 | 837 | 2.2 | — | — |
| Nabond (corn starch with high amylose content) | 837 | 2.2 | 837 | 2.2 | — | — | 837 | 2.2 | 837 | 2.2[1] |
| Hylon (starch similar to Mira Quik C) | — | — | — | — | 837 | 2.2 | — | — | 837 | 2.2[1] |
| Soybean Oil | 373 | 1 | 373 | 1.7 | 373 | 1.7 | 373 | 1.7 | 373 | 1.7 |
| Tween 81 ® (ethylene oxide derivative of a sorbitol ester) | 81 | 0.2 | 81 | 0.2 | 81 | 0.2 | 81 | 0.2 | 81 | 0.2 |
| Carbowax ® 300 (polyethylene glycol having molecular weight of 300) | 203 | 0.5 | 203 | 0.5 | 203 | 0.5 | 203 | 0.5 | 203 | 0.5 |
| Igepal ® CA-360 (Octyl phenoxy poly-(ethyleneoxy) ethanol wetting agent) | 15 M liters | | 15 M liters | | 15 M liters | | 15 M liters | | 15 M liters | |
| C-SN-6 biocide | .38 M liters | | .38 M liters | | .38 M liters | | .38 M Liters | | .38 M liters | |
| Quaker 1680-601 (31% active aqueous emulsion of cationic imidazoline, ester and polyethylene | 100 | 0.26 | 400 | 1.1 | 250 | 0.66 | 200 | 0.53 | 200 | 0.53 |
| Solids | | 5.86 | | 5.90 | | 6.0 | | 5.93 | | 6.0 |

[1] Starch cooked at 220° F. (104° C.)

The foregoing has described a sizing composition and method of forming chopped glass fiber strand that provides a distinct advantage over the prior art in the water dispersibility of the sized glass fibers obtained in a slush. This advantage is gained by using the aqueous emulsion of the cationic imidazoline, ester and polyethylene percent by weight based on the weight of the lubricant.

10. The sizing composition of claim 9 wherein the wetting agent is polyethylene glycol 600 monolaurate.

11. The sizing composition of claims 2 or 7 having biocides selected from tributyl tin oxide or quarternary ammonium salts in an amount of around 3 milliliters per 75 gallons of the sizing composition.

12. In the method of forming chopped glass fiber strand for dispersion in a slush for producing glass paper, which comprises drawing glass streams through orifices in a bushing to form individual glass fibers, moving the fibers away from the bushing, chopping the fiber, applying to the fibers while they are moving and before they are chopped an aqueous sizing solution, comprising 0.1 to about 1.5 weight percent of the sizing composition being an aqueous emulsion having a cationic imidazoline, an aliphatic, aromatic, or polymeric ester; and polyethylene with the remaining amount of the sizing composition being water.

13. The method according to claim 12 wherein the sizing composition has about 1 to about 5 weight percent of a starch.

14. In the method of forming chopped glass fiber strands for dispersion in a slush for making glass paper which comprises drawing glass streams through orifices in a bushing to form individual glass fibers, moving the fibers away from the bushing at a high rate of speed and forming them into a strand, applying to the fibers while they are moving at this speed and before the strand formation, an aqueous sizing solution, comprising in weight percent of the total sizing solution about 0.1 to 1.5 weight percent of an aqueous emulsion having cationic imidazoline; aliphatic, aromatic, or polymeric ester; and polyethylene; and about 1 to about 5 weight percent of a starch; and about 1 to about 5 weight percent of a hydrogenated vegetable oil; and about 0.05 to about 2 weight percent of an emulsifying agent; and about 0.5 to about 2 weight percent of a humectant plasticizer; and about 40 to 100 percent by weight based on the weight of the hydrogenated vegetable oil of a wetting agent; and about 3 milliliters of a biocide to 75 gallons of the sizing composition.

15. Glass fiber strands coated with the sizing composition of claim 1 or 2.

16. Glass fiber strand having the dried residue of the sizing composition of claim 1 wherein the residue is present in an amount in the range of about 0.05 to about 0.3 LOI.

17. An aqueous sizing composition for glass fibers useful in rendering sized glass fibers with improved water dispensibility, comprising:
   a. about 0.1 to about 1.5 weight percent of the aqueous sizing composition of an aqueous emulsion mixture of cationic imidazoline; an aliphatic, aromatic or polymeric ester; and a polyethylene when the mixture is around 30 percent active,
   b. about 1 to about 5 weight percent of the aqueous composition of starch,
   c. about 1 to about 5 weight percent of the aqueous size composition of a hydrogenated vegetable oil lubricant,
   d. about 0.5 to about 2 weight percent of the aqueous sizing composition of an emulsifier,
   e. plasticizer in an amount of about 5 to about 50 weight percent based on the amount of starch, and
   f. wetting agent in an amount of about 100 to 150 percent by weight based on the weight of lubricant, to yield an aqueous sizing composition having about 0.1 to about 20 weight percent solids.

18. Glass fiber strands having the dried residue of the sizing composition of claim 17.

* * * * *